United States Patent [19]

Stroud et al.

[11] Patent Number: 5,140,127
[45] Date of Patent: Aug. 18, 1992

[54] LASER BARRIER MATERIAL

[75] Inventors: David Stroud; Arthur G. Corfe, both of Bristol, England

[73] Assignee: Rolls-Royce plc, London, England

[21] Appl. No.: 737,467

[22] Filed: Jul. 30, 1991

Related U.S. Application Data

[62] Division of Ser. No. 585,674, Sep. 20, 1990, abandoned.

[51] Int. Cl.$^5$ ............................................. B23K 26/00
[52] U.S. Cl. ............................ 219/121.71; 219/121.7; 252/582
[58] Field of Search ..................... 219/121.7, 121.71; 252/582

[56] References Cited

U.S. PATENT DOCUMENTS

| | | | |
|---|---|---|---|
| 3,142,665 | 7/1964 | Cardinal et al. | 260/92.1 |
| 4,440,918 | 4/1984 | Rice et al. | 526/246 |
| 4,530,972 | 7/1985 | Tatemoto et al. | 525/276 |
| 4,544,720 | 10/1985 | Ohmori et al. | 526/247 |
| 4,677,175 | 6/1987 | Ihara et al. | 526/254 |
| 4,873,414 | 10/1989 | Ma et al. | 219/121.7 |
| 4,883,716 | 11/1989 | Effenberger et al. | 428/421 |
| 5,011,626 | 4/1991 | Ma et al. | 252/582 |
| 5,049,722 | 9/1991 | Corfe et al. | 219/121.71 |

FOREIGN PATENT DOCUMENTS

| | | |
|---|---|---|
| 1228438 | 4/1971 | United Kingdom . |
| 1349308 | 4/1974 | United Kingdom . |
| 0135917 | 4/1985 | European Pat. Off. . |
| 296559 | 12/1988 | European Pat. Off. . |
| 301268 | 12/1988 | Japan . |

OTHER PUBLICATIONS

Encyclopedia of Polymer Science and Technology (Plastics Resins Rubber Fibre) Ed. by Mark, etc.; vol. 7, p. 197.

Primary Examiner—C. L. Albritton
Attorney, Agent, or Firm—Oliff & Berridge

[57] ABSTRACT

In the laser drilling of a hole through a wall of a gas turbine blade into a cavity within the blade there is provided an injectable PTFE substitute for injection into the cavity before laser drilling. The PTFE substitute prevents strike-through of laser light to the opposite wall of the cavity. The PTFE substitute used is fluorinated ethylene propylene or a copolymer having a PTFE backbone and fully fluorinated alkoxy side groups.

4 Claims, 1 Drawing Sheet

LASER BARRIER MATERIAL

This is a division of application Ser. No. 07/585,674, filed Sep. 20, 1990, now abandoned.

FIELD OF THE INVENTION

This invention relates to laser drilling of components, particularly, although not exclusively, the drilling of holes in gas turbine components such as hollow turbine blades.

The laser drilling of holes such as film-cooling holes into internal passages of turbine blades has been known for some time. However, a problem that commonly arises is that of preventing the laser beam from damaging the wall of the passage opposite to where the laser beam breaks through. Another problem that arises is that of preventing material sputtered or vaporised by the beam from being deposited on the inner surfaces of the passage.

DISCUSSION OF THE PRIOR ART

Attempts have been made to insert barriers in the passages, and indeed in passages or cavities which are relatively large and do not have complicated shapes it is possible to insert a solid piece of barrier material such as polytetrafluoroethylene (PTFE), which particular material has excellent laser barrier properties.

However, it may be difficult or impossible to insert a piece of barrier material into a passage or cavity which is convoluted or too small. In these instances it is common practice to inject or pour a thermosetting fluid, such as wax, into the passage or cavity. Wax has disadvantages in some circumstances, in that it does not always provide the required protection against strike-through, especially when passages are of small dimensions, and tends to solidify before the passage or cavity is completely filled. PTFE, as mentioned above, provides the required barrier properties against laser light but cannot be injected or poured.

It is an object of the present invention to provide a substitute for PTFE which has similar resistance to strike-through as PTFE but is capable of being injected into a cavity.

SUMMARY OF THE INVENTION

According to a first aspect of the present invention there is provided an injectable barrier material for use in laser machining of a component to protect a surface of the component which is in the path of a laser beam from being machined by the laser beam, the material comprising a composition selected from the group consisting of a first copolymer of tetrafluoroethylene and hexafluoropropylene and a second copolymer having a PTFE backbone and at least one fluorinated alkoxy side group.

According to a second aspect of the present invention there is provided a method of drilling a hole through a wall of a hollow component by means of a laser beam into the interior of the component so as to protect an interior surface of the component from being machined by the beam, comprising melting a composition selected from the group consisting of a first copolymer of tetrafluoroethylene and hexafluoropropylene and a second copolymer having a PTFE backbone and at least one fluorinated alkoxy side group, pouring or injecting the molten composition into the interior of the component, permitting the molten composition to solidify, drilling the hole through the wall by means of the laser beam, the energy of the beam being dissipated by the solidified composition within the component, and subsequently steaming out the composition.

BRIEF DESCRIPTION OF THE DRAWING

The invention will now be described by way of example only with reference to the following examples and the accompanying diagrammatic FIG. 1 which shows a transverse section through a hollow turbine blade.

DESCRIPTION OF THE PREFERRED EMBODIMENTS

Figure 1:
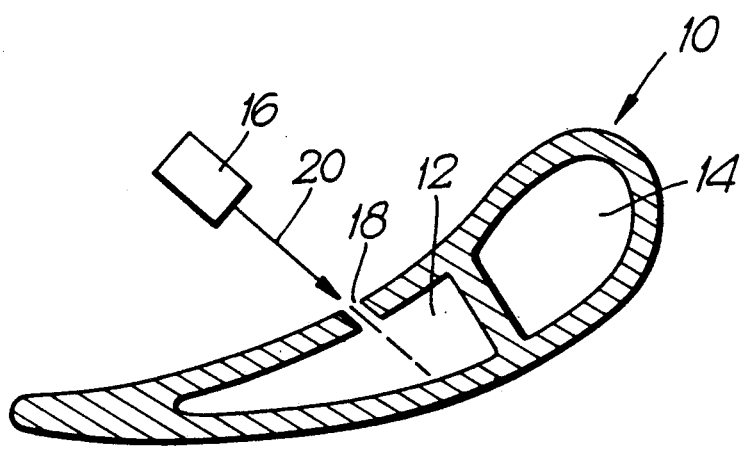

Referring to FIG. 1 there is shown in transverse section a gas turbine blade 10 having internal longitudinally extending cavities 12, 14. There is provided a laser source 16 to drill a film-cooling hole 18 through to one of the cavities (e.g. cavity 12 as shown) by means of a laser beam 20.

EXAMPLE 1

Prior to the drilling of hole 18 into cavity 12 in the gas turbine blade 10, a flurocarbon resin barrier material comprising TEFLON PFA—a Trade Mark of E. I. Du Pont de Nemours & Co. (Inc.)—being a copolymer consisting of a PTFE backbone and fully fluorinated alkoxy side groups described in "Properties Handbook of TEFLON PFA Resins for Design Engineers" published by Du Pont under their reference E-84055, is heated to its melting point of 302°-310° C., injected in its molten state into the cavity 12 from one end of the blade, and is allowed to cool and solidify. It is found, on using the laser to drill hole 18 into the barrier-filled cavity 12, that the TEFLON PFA provides an effective barrier against laser light similar to that provided by PTFE on its own, by dissipating the energy of the laser beam, thus preventing strike-through of laser light to the opposite wall of the cavity. When the desired number of air-cooling holes has been drilled in the blade the PFA barrier material is steamed out of the cavity 12.

EXAMPLE 2

Prior to the drilling of hole 18 into cavity 12 in the gas turbine blade 10, a fluorocarbon resin barrier material comprising TEFLON FEP—a Trade Mark of E. I. Du Pont de Nemours & Co. (Inc.)—being a copolymer of tetrafluoroethylene and hexafluoropropylene described in Du Pont's Product Information pamphlet entitled "TEFLON FEP" published under their reference E-96223, is heated to its melting point of 255° C., injected into the cavity 12 from one end of the blade, and is allowed to cool and solidify. It is found, on using the laser to drill hole 18 into the barrier-filled cavity 12, that the TEFLON FEP provides an effective barrier against laser light similar to that provided by PTFE on its own, by dissipating the energy of the laser beam, thus preventing strike-through of laser light to the opposite wall of the cavity. When the desired number of air-cooling holes has been drilled in the blade the FEP is steamed out of the cavity 12.

The TEFLON PFA and TEFLON FEP have the advantages of PTFE in providing an effective barrier against laser light, but have the advantage over PTFE in that they can be injected or poured, unlike PTFE.

The PFA copolymer need not have all its alkoxy side groups fully fluorinated, as long as there is sufficient fluorine in the molecule to provide the required stability and resistance to laser strike-through whilst retaining the features that it can be injected into the cavity, solidifies whilst in the cavity, and is easily removed by, for example, steaming.

We claim:

1. A method of drilling a hole through a wall of a hollow component by means of a laser beam into the interior of the component so as to protect an interior surface of the component from being machined by the beam, comprising melting a composition selected from the group consisting of a first copolymer of tetrafluoroethylene and hexafluoropropylene and a second copolymer having a PTFE backbone and at least one fluorinated alkoxy side group, pouring or injecting the molten composition into the interior of the component, permitting the molten composition to solidify, drilling the hole through the wall by means of the laser beam, the energy of the beam being dissipated by the solidified composition within the component, and subsequently steaming out the composition.

2. A method as claimed in claim 1 wherein the second copolymer is provided with a plurality of fluorinated alkoxy side groups.

3. A method as claimed in claim 1 wherein at least one alkoxy side group is fully fluorinated.

4. A method as claimed in claim 2 wherein all the alkoxy side groups of the second polymer are fully fluorinated.

* * * * *